(12) United States Patent
Ci et al.

(10) Patent No.: US 7,096,274 B1
(45) Date of Patent: Aug. 22, 2006

(54) OPTIMUM FRAME SIZE PREDICTOR FOR WIRELESS LOCAL AREA NETWORK

(75) Inventors: Song Ci, Omaha, NE (US); Hamid Sharif, Omaha, NE (US); Albert Young, Cupertino, CA (US)

(73) Assignee: 3COM Corporation, Marlborough, MA (US)

( * ) Notice: Subject to any disclaimer, the term of this patent is extended or adjusted under 35 U.S.C. 154(b) by 633 days.

(21) Appl. No.: 10/074,803

(22) Filed: Feb. 12, 2002

(51) Int. Cl.
*G06F 15/16* (2006.01)

(52) U.S. Cl. .................. 709/236; 709/235; 370/333; 714/776

(58) Field of Classification Search ........ 709/220–222, 709/232–236; 370/464–5, 470–472, 333; 455/67.13
See application file for complete search history.

(56) References Cited

U.S. PATENT DOCUMENTS

| | | | | |
|---|---|---|---|---|
| 5,307,351 A | * | 4/1994 | Webster | 370/470 |
| 5,828,672 A | * | 10/1998 | Labonte et al. | 370/333 |
| 6,236,647 B1 | * | 5/2001 | Amalfitano | 370/335 |
| 6,240,099 B1 | * | 5/2001 | Lim et al. | 370/441 |
| 6,463,074 B1 | * | 10/2002 | Johnson et al. | 370/442 |
| 6,625,155 B1 | * | 9/2003 | Dziong | 370/395.2 |
| 6,665,283 B1 | * | 12/2003 | Harris et al. | 370/333 |

* cited by examiner

*Primary Examiner*—David Wiley
*Assistant Examiner*—Joseph E. Avellino

(57) ABSTRACT

The present invention relates to a method for predicting an optimum transmission frame size in a wireless computer network. The method comprises assessing transmission channel quality in the network, calculating an optimum length for the transmission frame, adjusting the length of the transmission frame to the predicted optimum length, transmitting the frame at its adjusted length and assessing the quality of the transmission of the frame. Prediction of the optimum frame size employs a Kalman filter which employs the parameters of bit error rate and random processing noise in the calculation of the predicted optimum frame length.

20 Claims, 4 Drawing Sheets

OPTIMUM FRAME SIZE PREDICTOR FOR WIRELESS LOCAL AREA NETWORK

FIELD OF THE INVENTION

The present invention relates to the field of Local Area Networking (LAN). More specifically, the present invention relates to a method and system for optimizing data frame size to maximize channel efficiency in a network.

BACKGROUND OF THE INVENTION

Modern networks continue to provide electronic devices the ability to communicate with other devices. The continuing growth of networking systems and technology seems limitless and the speed of networked communications has brought benefits to nearly every human endeavor. Local Area Networking (LAN), particularly, is evolving rapidly into wireless connectivity and bringing another level of performance and convenience to the home and business networking environment.

Networks, even if relatively small, can consist of enormous numbers of devices. The complexity of networks continues to expand as does the application of network concepts to more and more disciplines and environments. With the growing market for wireless data networks, there is considerable interest in integrating the support of new services such as wireless voice telephony, MP3 and other demanding protocols.

In wireless data networking, whether implemented by RF or infrared technology, data are transmitted over channels in data frames. The rate of frame transmission varies with volume of transmissions throughout the network. The quality of a channel, which is analogous to the rate at which a channel is able to carry data frames error free, varies over time due to burst errors or changes in the operating environment. At times, usually the times of highest demand, channel quality can cause channel efficiency to be very low. This time-varying channel quality, and thus channel efficiency, is not addressed in wireless network standards such as the current IEEE 802.11 specifications. Many Quality-of-Service (QoS) requirements are thus very difficult to achieve. Note that IEEE 802.11 is the emerging standard for wireless network data communications.

In wireless networking, the frame size and bit-error rate (BER) affect the channel efficiency. There is an optimum frame size which depends on the channel quality. When the channel quality is good, the frame size can be larger, and when channel quality is bad, large frame size will cause very high frame-error-rate (FER). However, if the frame size selected is too small, the channel efficiency will be lowered because of the fixed overhead in the header of the frame. In current wireless and mobile networks, there is no method for adjusting the frame size dynamically in order to maintain any specified channel efficiency. Since the channel quality is time-varying due to multipath fading, path loss, and other factors, the prevalent static frame size schemes result in the loss of overall system performance.

What is needed, then, is a method for dynamically varying the data frame size in an operating network. Such a method must adjust frame size to the optimum size based on predictions of optimum frame size in a noisy wireless network environment.

SUMMARY OF THE INVENTION

The present invention provides a method for dynamically varying the data frame size in an operating wireless network. The method adjusts the data frame size to the optimum size based on predictions of optimum size and does so in a noisy wireless network environment.

The present invention relates to a method for predicting an optimum transmission frame size in a wireless computer network. The method comprises assessing transmission channel quality in the network, calculating an optimum length for the transmission frame, adjusting the length of the transmission frame to the predicted optimum length, transmitting the frame at its adjusted length and assessing the quality of the transmission of the frame. Prediction of the optimum frame size employs a Kalman filter which employs the parameters of bit error rate and random processing noise in the calculation of the predicted optimum frame length.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation of this invention can be best visualized by reference to the drawings.

Figure 1:
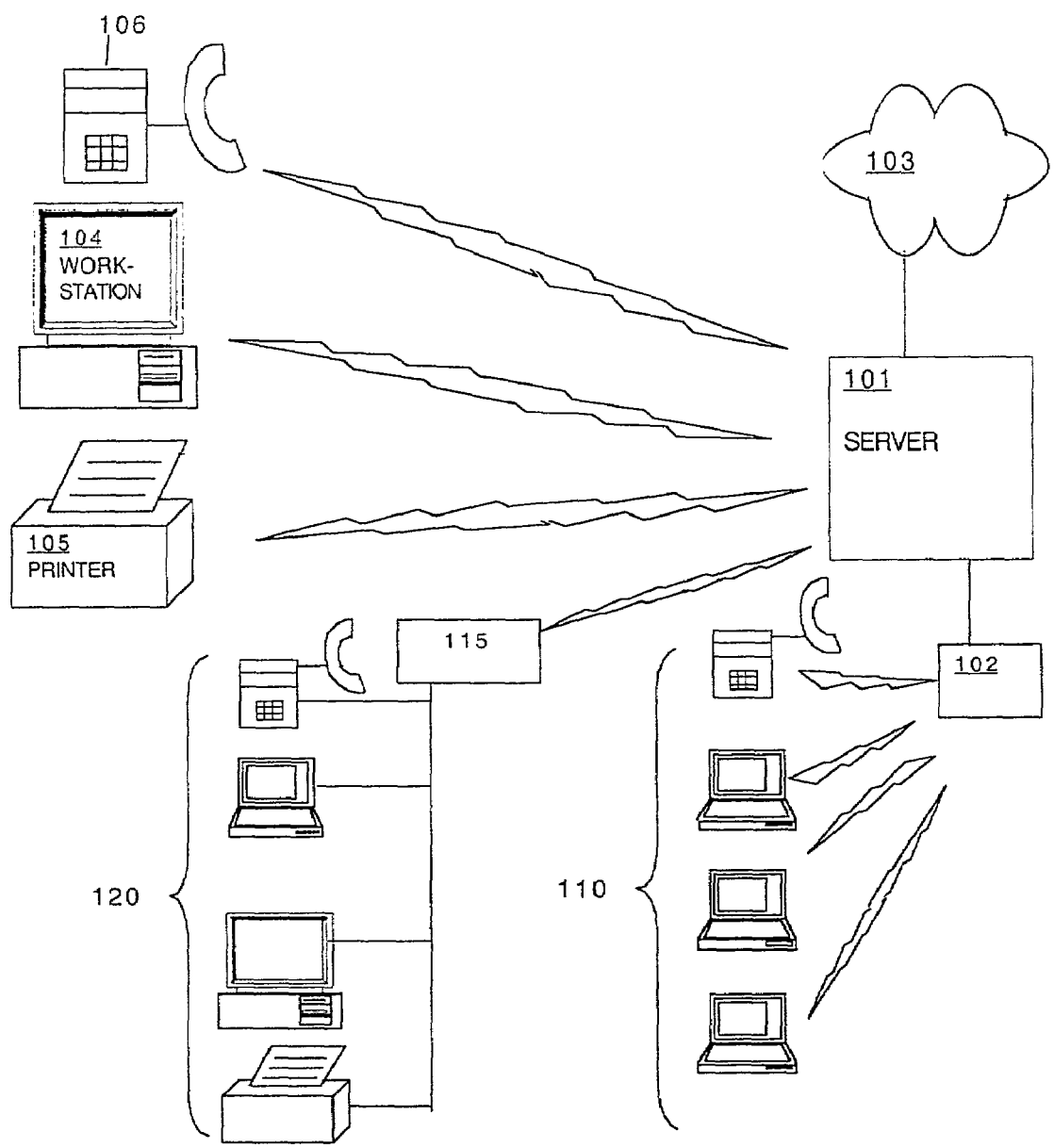
FIG. 1 illustrates a typical wireless LAN implemented with a server and work centers.

The drawings referred to in this description should be understood as not being drawn to scale except if specifically noted.

DETAILED DESCRIPTION

Reference would now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on signals within an electronic circuit. These descriptions and representations are the means used by those skilled in the electronic arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in an electronic system.

There are many conceivable embodiments of the present invention. However, the concepts underlying the present invention may be best understood by the discussion of only a few embodiments. This discussion in no way limits the application of the concepts nor determines the limit to embodiments possible.

The development of wireless LANs has been accomplished primarily by adapting wired LAN techniques to RF technology. The channel access mechanism used in most wireless LANs is closely derived from Ethernet and is based on packet, or frame, contention. As the wireless medium is different from the wired medium, the medium access control (MAC) protocol has been adapted to take these differences into account, and wireless MAC protocols continue to evolve to better use wireless channels.

One of the main constraints of the wireless medium is that bandwidth is limited. A shared medium capable of 100 Mb/s is very common in the wired world, but the bit rate of common wireless LANs is only slowly gaining on wired counterparts. Because the resource is limited, the medium is very likely to be used to its full capacity, and the efficiency and the quality of service of the protocol is a real concern In wireless networking, all data transmission is contained in frames, or packets. The optimum frame size depends on the channel quality. When the channel quality is good, the frame size can be larger, and when channel quality is bad, a large frame size will cause very high frame-error-rate (FER). However, if the frame size selected is too small, channel efficiency will be much lowered because of the fixed overhead in the header of each frame. In current wireless and mobile networks, there is no method of adjusting the frame size dynamically in order to maintain any specified channel efficiency. Since the channel quality is time-varying due to multipath fading, path loss, and other factors, the prevalent static frame size schemes result in the loss of overall system performance.

The evolving standard for wireless high speed network communications is IEEE 802.11 which is incorporated herein by reference. In the implementation of the IEEE 802.11 standard, fragmentation is used to improve the channel efficiency by fragmenting the size of larger frames into several smaller size frames. However, there does not, prior to the present invention, exist any optimum scheme of dynamically changing the fragmentation threshold according to the changing channel quality of the channels in use.

In this discussion of embodiments of the present invention, a theoretical model to characterize the relationship between channel quality and frame size is derived. Based on this theoretical model, an optimum predictor can be developed. With the approach this affords, an optimum frame size can be accurately predicted. Hence the system performance in terms of channel efficiency can be improved and can be maintained.

In the embodiment discussed herein, a series of computing processes for changing the fragmentation dynamically is disclosed. However, in operation, the computing processes' performances will depend on an optimum fragment threshold which is acquired from experiments and no prediction method is adopted. In network operation this is not very practical since the network environment and the channel quality may be very different from one environment to another and from one moment to another.

There are some processes extant that focus on wireless channel parameter prediction. The resultant predictions are for maximum channel efficiency, the maximum likelihood, and the moving average. The maximum channel efficiency process is unable to achieve a closed form prediction equation and it is computationally intensive. The maximum likelihood process has the closed form of a prediction equation but it is still computationally intensive. The moving average process must maintain past values for computing the next value, so it is memory dependent and memory consuming. Moreover, the prediction effects of these techniques are very loose. These existing predictive processes are unable to accurately predict a frame size or a fragmentation threshold in a wireless network environment, especially in a wireless LAN environment.

One embodiment of the present invention develops an optimum system parameter predictor. The basis of this predictor would be the current channel quality measured in terms of signal to noise ratio (SNR). The example used in the embodiment discussed here is a Local Optimum Frame Size Predictor (LOFSP). The local optimum frame size used for transmission at the next transmission time slot can be accurately predicted, thus channel efficiency can be improved greatly. In this way, the committed quality of service (QoS) can be well maintained even though the channel quality may be changing quickly.

In IEEE 802.11-based wireless local area networking, an LOFSP can be very effective in deciding the optimum fragmentation threshold dynamically with current channel quality. With an accurate predictor, the system performance can be improved and maintained. This embodiment of the present invention can also be applicable to other system parameters such as modulation schemes, TCP congestion window size etc.

The LOFSP discussed here makes use of signal estimation and prediction techniques such as a Kalman Filter. Since a Kalman Filter does not require the maintenance of all previous values to predict a next value, the demand on memory can be reduced, resulting in a cost savings, yet at the same time can give very accurate prediction results. The LOFSP predictor can achieve the committed channel efficiency by predicting the optimum frame size for the next frame under the noisy wireless environment. This requires theoretical characterization of the problem and then use of the derived model and filtering technique to improve the system performance.

The discrete Kalman filter is used in situations where a continuous process is sampled at discrete time intervals, very much as is the case in an operating Ethernet where communications are ongoing and the frame transmission process is sampled at discrete intervals. The filter is a recursive, predictive, update technique used to determine the correct parameters of the process model. Given some initial estimates, it allows the parameters of a model to be predicted and adjusted with each new measurement, providing an estimate of error at each update. Its ability to incorporate the effects of noise (from both measurement and modeling), and its computational structure, has made it very popular for use in computer related applications. It is necessary to note at this point that there are other filtering techniques well suited to use in this embodiment of the present invention. However, a discrete Kalman filter is particularly adept at the requirements identified herein.

The application of Kalman filtering in this embodiment of the present invention requires a recursive assessment of channel quality in the wireless communication of data. This assessment is made by assessing the bit error rate and basing the predicted optimum frame size on the feedback that such an assessment provides.

The closed form prediction model can be as described below:

$$L(k+1)=L(k)*Pb(k)/Pb(k+1)+r(k+1);$$

where:
  $L(k+1)$ is the optimum predicted frame size in time k+1
  $L(k)$ is the optimum predicted frame size in time k
  $Pb(k)$ is the bit error rate in time k
  $Pb(k+1)$ is the bit error rate in time k+1
  $r(k+1)$ is the random processing noise at time k+1

The value of Pb will be affected by the various modulation schemes, noise at the receiving device and other parameters. This means that it is changing dynamically.

This embodiment of the present invention can give a very accurate prediction by comparison with some normally used prediction schemes such as a moving average method. Moreover, the proposed scheme is very easy to implement. The methodology of proposed scheme is extended to the prediction of other system parameters such as the back off window size in 802.11.

Further understanding of the concepts presented in this discussion of embodiments of the present invention may be aided with reference to the attached drawings. FIG. 1 illustrates a typical wireless LAN, characteristic of the systems in which embodiments of the present invention operate, implemented with a server 101 and several communicating devices. Workstation 104 communicates by a direct wireless connection with the communication device of server 101 as do printer 105 and VoIP (voice over internet protocol) enabled voice telephone 106. Theses devices are illustrated for the sake of illustration of direct server communication with peripheral elements in the network which is only one of several means available to a complex network system.

Work center 110 includes the exemplary devices of a desktop PC, a printer, a VoIP phone and a laptop PC. These devices are cable-connected to remote communication device 115 which communicates wirelessly with server 101. Peripheral group 120 includes a VoIP phone and a number of laptop computers. Each of these devices communicate wirelessly with remote wireless hub 102 which is cable-connected to server 101. Most wireless networks also include a wireless or wired connection to the Internet, illustrated in FIG. 1 at 103.

A typical wireless network may contain numberless variations of the devices illustrated in FIG. 1 or possibly network elements not illustrated. Nevertheless, each network element uses wireless communication with the server, with its peripheral switching mechanisms or with other elements in the network. The demands on the wireless connections can be enormous in an extensive and complex network.

Figure 2:
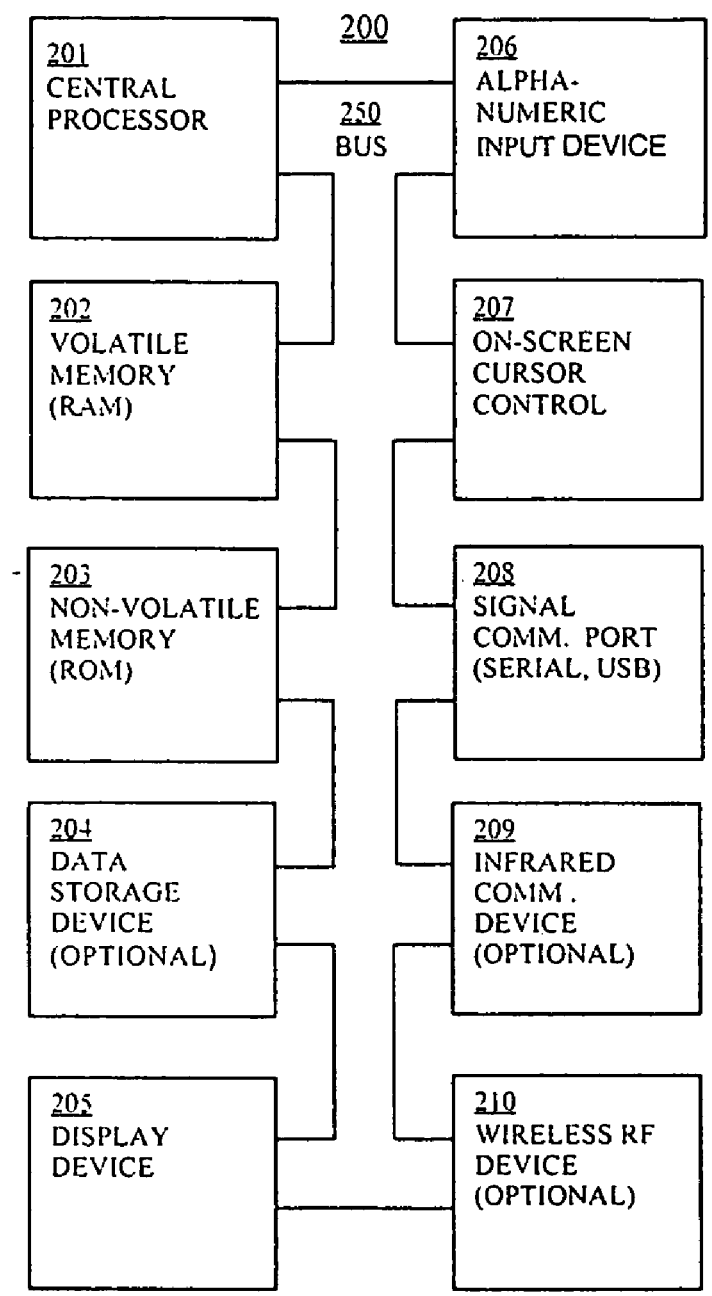
FIG. 2 illustrates a block diagram of a typical computing device in which the present invention operates in one embodiment.

FIG. 2 illustrates a functional block diagram of a computer typical of the kind of device that would employ embodiments of the present invention. Computer system 200 comprises bus 250 which connects processor 201, volatile RAM 202, non-volatile ROM 203 and data storage device 204. Also connected to the bus are display device 205, alpha-numeric input device 206, cursor control 207, and signal I/O device 208 which may use serial, parallel, USB or other wired communication protocol. Infrared communication device 209 and wireless RF communication device are both shown as optional devices in order to illustrate that embodiments of the embodiment of the present invention may be employed in different implementations of wireless networks. However, some means of wireless communication may be necessary in LANs using any of these embodiments.

Figure 3:
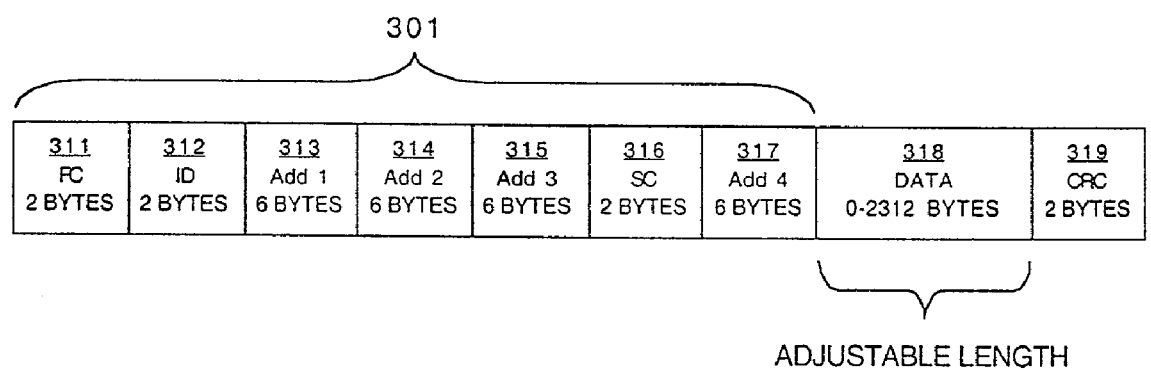
FIG. 3 illustrates a block diagram of a typical frame format in a wireless network in accordance with one embodiment of the present invention.

FIG. 3 illustrates a standard frame format as defined in IEEE 802.11. Header 301 contains 30 bytes (240 bits) of necessary header information including 2 bytes for frame control 311, 2 bytes for identification 312, 6 bytes each for the $1^{st}$, $2^{nd}$ and $3^{rd}$ address fields 313, 314 & 315 respectively, 2 bytes for sequence control 316 and 6 more address bytes in the $4^{th}$ address field 317. Header 301 is defined in the standard and is not changeable. However, data field 318 is variable from 0 to 2312 bytes and represents the changeability that can be used in this embodiment of the present invention. The 2 byte check sequence (CRC) field 319 allows error checking by the receiver. Note that, though data field 318 is easily changeable in length, in other embodiments of the present invention, other fields may add changeability to the length of a transmission frame.

The frame overhead consists of the fields in the header and the CRC field. The overhead totals 32 bytes (256 bits) which is always included in every frame, whether it includes significant amounts of data or not. Therefore, only data field 318 can be changed in order to alter frame length.

Figure 4:
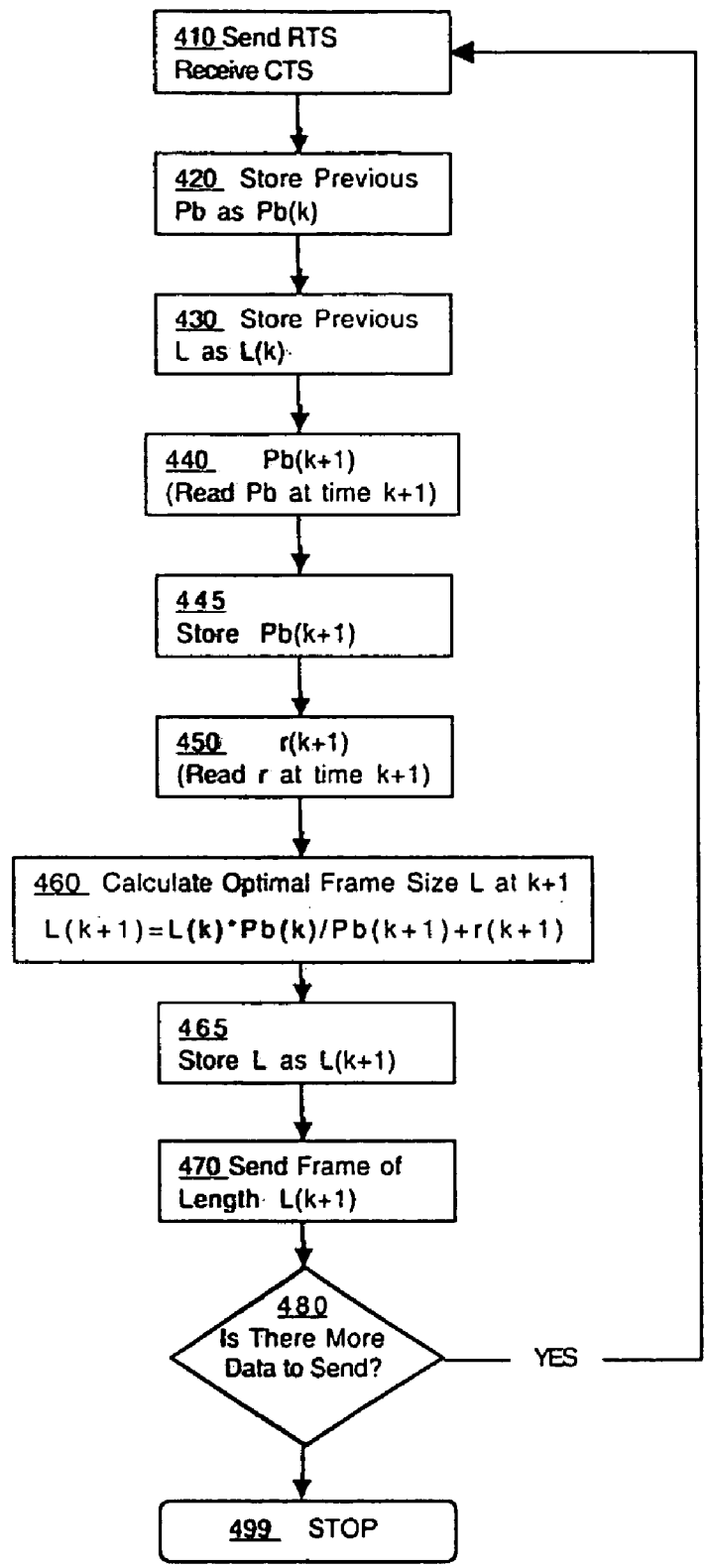
FIG. 4 illustrates a block flow diagram of an optimum frame size predictor in accordance with one embodiment of the present invention.

This embodiment of the present invention can employ the calculations discussed earlier to adjust the frame size to an optimum driven by a need for optimum channel efficiency in the face of changing channel quality. One method by which this can be accomplished is illustrated in the block flow diagram shown in FIG. 4. There, a potential transmitting device which is ready to transmit data sends a request-to-send (RTS) and receives a clear to send (CTS) at step 410.

At step 420, the previous measurement of bit error rate Pb is taken as Pb at time k, or Pb(k). This step sets k equal to a given time in transmission operation.

The prior optimum frame length prediction is taken at step 430. The value thus attained is labeled as L at time k, or L(k).

A new measurement of bit error rate is made at 440. The new value is labeled as Pb at time k+1, or Pb(k+1). Pb(k+1) is stored at step 445.

A random processing noise assessment is also taken at step 450. The value that results is labeled r(k+1).

The optimum frame size is calculated then, at step 460, based on the current and prior measurements. The calculation assumes the form $L(k+1)=L(k)*Pb(k)/Pb(k+1)+r(k+1)$. The calculated optimum frame size is stored at step 465.

The calculated optimum length is then used to adjust the transmitted frame length. This is accomplished by transmitting the appropriate amount of data is in an appropriate length frame, at step 470.

A check for more data waiting for transmission is made at step 480. If more data requires transmission, the process begins anew at step 410. If not, the process stops at step 499 in order to await new data.

It is important to note that, though this discussion of embodiments of the present invention refers to optimizing transmission frame size, other system parameters may also be addressed using the same methodology. For example, back-off window size could be optimized using a similar Kalman filtering approach and prediction algorithm.

A novel method for predicting optimum frame size in a wireless LAN has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a computer network, a method for predicting an optimum transmission frame length, comprising:
    assessing transmission channel quality in said computer network, said assessing comprising;
        obtaining a bit error rate for a previous transmission; and
        obtaining an optimum frame length for said previous transmission;
    calculating an optimum length for said transmission frame, said calculating comprising;
        measuring a new bit error rate; and
        obtaining an assessed random processing noise;
    adjusting the length of said transmission frame, said adjusting predicated on said bit error rate and said optimum frame length for said previous transmission and said new bit error rate and said assessed random processing noise;
    transmitting said transmission frame of said adjusted length; and
    assessing the quality of said transmission of said transmission frame, wherein said transmission channel quality is assessed recursively using a Kalman filter.

2. A method as described in claim 1 wherein said computer network is implemented as a wireless Ethernet.

3. A method as described in claim 1 wherein said assessing of said transmission channel quality is achieved by measuring the bit error rate of said transmission channel.

4. A method as described in claim 3 wherein said measuring said bit error rate comprises measuring said bit error rate of a previous transmission.

5. A method as described in claim 1 wherein said calculating of said optimum length for said transmission frame is accomplished in a dedicated transmitting device.

6. A method as described in claim 1 wherein said calculating of said optimum length for said transmission frame is accomplished in a computer.

7. The method described in claim 1 wherein said assessing the quality of transmission is accomplished by measuring the bit error rate of said transmission.

8. A system for optimizing transmission frame size in a network, comprising:
    a network comprising one or more computers and one or more wireless communication devices;
    wireless communication communicatively connecting said computers and said wireless communication devices in said network wherein said wireless communication transmits data using data transmission frames; and
    a transmission device enabled to adjust the length of said transmission frames based on a method comprising:
        assessing transmission channel quality in said computer network, said calculating comprising;
            measuring a new bit error rate; and
            obtaining an assessed random processing noise;
        calculating an optimum length for said transmission frame, said calculating comprising;
            measuring a new bit error rate; and
            obtaining an assessed random processing noise;
        adjusting the length of said transmission frame, said adjusting predicated on said bit error rate and said optimum frame length for said previous transmission and said new bit error rate and said assessed random processing noise;
        transmitting said transmission frame of said adjusted length; and
        assessing the quality of said transmission of said transmission frame,
    wherein said transmission channel quality is assessed recursively using a Kalman filter.

9. The system described in claim 8 wherein said network is implemented as a wireless Ethernet.

10. The system described in claim 8 wherein said transmission device adjusts said length of said transmission frames to a predicted optimum frame length.

11. The system described in claim 8 wherein an element of said network is enabled to assess the bit error rate of transmission in said wireless communication.

12. The system described in claim 8 wherein an element of said network is enabled to assess random processing noise in said wireless communication.

13. The system described in claim 8, wherein said optimum frame length is predicted by use of a Kalman filter.

14. The system described in claim 13 wherein said Kalman filter employs random processing noise and bit error rate in said predicting of said optimum frame length.

15. A data transmission frame for network communication comprising:
    a header section comprising one or more fields of header data;
    a data field sequentially coupled with said header section and having a length capable of adjustment; and
    an error checking field sequentially coupled with said data field and said header section, wherein said data field is adjusted to an optimum length for transmission using a method comprising:
        assessing transmission channel quality in said computer network, said assessing comprising;
            obtaining a bit error rate for a previous transmission; and
            obtaining an optimum frame length for said previous transmission;
        calculating an optimum length for said transmission frame, said calculating comprising;
            measuring a new bit error rate; and
            obtaining an assessed random processing noise;
        adjusting the length of said transmission frame, said adjusting predicated on said bit error rate and said optimum frame length for said previous transmission and said new bit error rate and said assessed random processing noise;
        transmitting said transmission frame of said adjusted length; and
        assessing the quality of said transmission of said transmission frame, wherein said transmission channel quality is assessed recursively using a Kalman filter.

16. A data transmission frame as described in claim 15 wherein said data transmission frame is an Ethernet standard data transmission frame.

17. A data transmission frame as described in claim 15 wherein said data field is adjusted using a prediction of said optimum length.

18. A data transmission frame as described in claim 17 wherein said prediction of said optimum length for transmission calculated by a Kalman filter.

19. A data transmission frame as described in claim 17 wherein said prediction of said optimum length for transmission is calculated by reference to transmission bit error rate.

20. A data transmission frame as described in claim 17 wherein said prediction of said optimum length for transmission is calculated by reference to random processing noise.

* * * * *